G. ERLWEIN & E. MARQUARDT.
APPARATUS FOR AERATING WATER.
APPLICATION FILED JUNE 10, 1909.
950,999.
Patented Mar. 1, 1910.
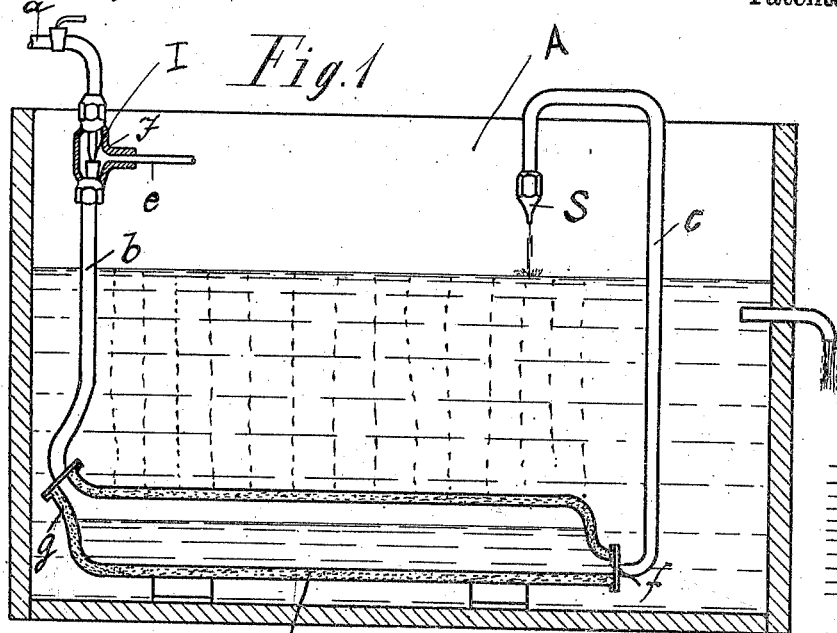
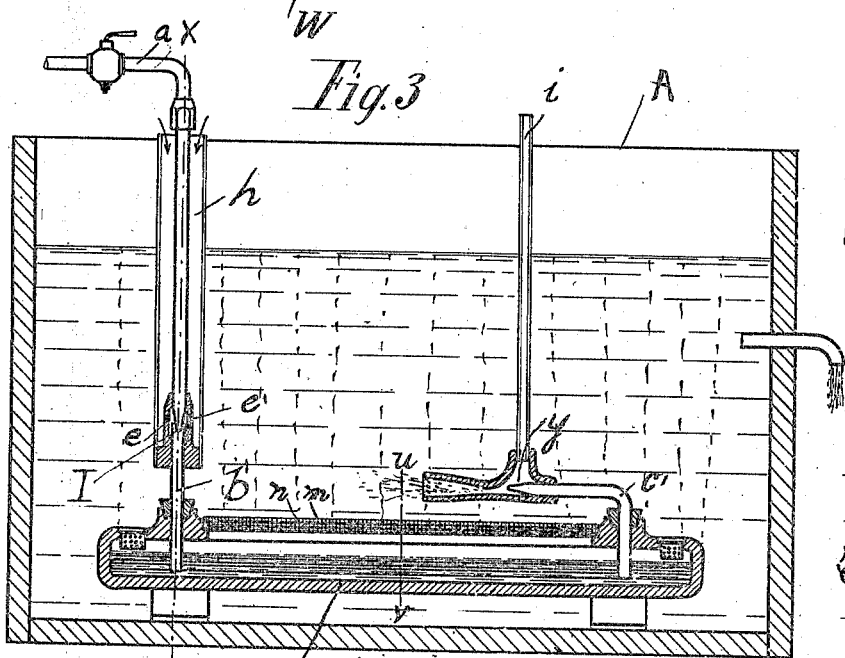
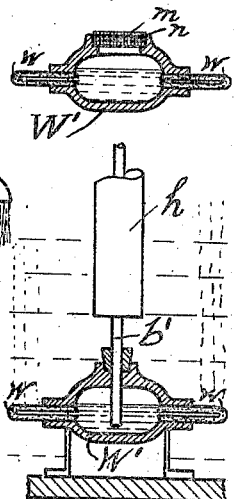
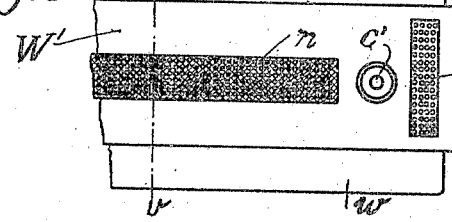
Witnesses
H. H. Knight.
Ray T. Ernst.
Inventors
Georg Erlwein and
Ernst Marquardt
by
his attorneys

UNITED STATES PATENT OFFICE.

GEORG ERLWEIN, OF BERLIN, AND ERNST MARQUARDT, OF KAROW, NEAR BERLIN, GERMANY.

APPARATUS FOR AERATING WATER.

950,999.   Specification of Letters Patent.   Patented Mar. 1, 1910.

Application filed June 10, 1909. Serial No. 501,400.

*To all whom it may concern:*

Be it known that we, GEORG ERLWEIN and ERNST MARQUARDT, subjects of the German Emperor, and residing, respectively, at Fasanenstrasse 70, Berlin, and Florastrasse 6, Karow, near Berlin, Empire of Germany, have invented certain new and useful Improvements in Apparatus for Aerating Water, of which the following is a specification.

The subject-matter of our invention is improved apparatus for aerating water, for the purpose of supplying oxygen thereto and removing carbonic acid therefrom, water at a pressure above atmospheric being employed.

For keeping fish and other aquatic animals alive in water in tanks it is above all necessary, besides removing excess of carbonic acid, to dissolve in the water the oxygen, which is necessary for enabling the animals to breathe, at the same speed as the fish or other animals take it from the same. On account of the small percentage of oxygen contained in ordinary water very considerable quantities of water are necessary if the consumption of oxygen is to be covered solely by allowing fresh water to flow into the tanks. Therefore various means have been employed heretofore for accelerating in other ways the reception of oxygen by the water.

Now it has been known that when air bubbles are passed through water, only a relatively small quantity of the oxygen blown in is absorbed if the distribution of the gas is not exceptionally good. Having regard to this circumstance jets of water which carry with them air in the form of small bubbles have been squirted into the water, or water and air carried along with it have been simultaneously supplied to the water by means of injectors, jets of water and the like. Also, for the purpose of distributing and intimately mixing water and gas trickle apparatus or porous receivers have been employed, through which air is forced by means of an air pump. As airpump a trompe may, of course, be used which supplies the aerated water for working the blowing apparatus in addition to the required air. The employment of a trompe in combination with air distributers has, however, the disadvantage that the outlets for air and water from the so-called drum, in which the mixture of air bubbles and water coming from the injector are separated and separately conducted away, must be exactly regulated so that only air flows from the air outlet or pipe and only water from the lower water outlet. Owing to this drawback trompes regulated by stopcocks or valves cannot be employed.

Now a primary object of our invention is to provide apparatus in which the well-known water-jet injector is used for impelling the air and compressing it, but the mixed air and water from the injector are not separated first in a special vessel, the so-called water drum, and then supplied separately to the air distributer in the water and to the tank containing the fish, but are conducted together to a vessel in the water in the tank containing the fish, and this vessel is simultaneously a water drum for separating air and water and an air distributer for saturating the water with atmospheric oxygen. By uniting in this manner the water separator and air vessel with the porous air distributer under the water which is to be aerated, the advantage is obtained that the quantities of air and water forced out of this vessel are automatically regulated by the water level at any time in this vessel. For example, if the quantity of air passing through the porous walls is too large, the water rises in the porous air vessel, covers a portion of the porous surface of the same and thus diminishes the quantity of air passing through the wall. Consequently the air pressure in the air vessel remains approximately constant. On the contrary, if the injector supplies more air than can pass through the exposed porous wall which is temporarily above the water in the air vessel, the water level in the air vessel is forced downward and a larger surface permeable to air is exposed. Consequently, when the parts of the apparatus are suitably proportioned its regulation is perfectly certain and automatic.

In order that our invention may be clearly understood we will now described the same with reference to the accompanying drawing in which some embodiments are represented by way of example.

In said drawings: Figure 1 is a vertical longitudinal section through one constructional form of our apparatus, and Fig. 2 is a vertical transverse section through a detail of the same. Fig. 3 is a vertical longitudinal section through a modified form, whereas Fig. 4 is a vertical transverse section of this modified form in the plane $x\ y$, parts being broken away, showing substantially the arrangement of the air vessel in this plane. Fig. 5 is a top plan view of the right hand side of same air vessel, and Fig. 6 is a transverse section through the air vessel in the plane $u\ v$.

Referring to the drawing and firstly particularly to Figs. 1 and 2, I is a water-jet injector which is fed through pipe $a$ and sucks in air through the pipe $e$. The mixture of air and water is forced into the porous, cylindrical or triangular vessel W through pipe $b$ and the neck $g$ of the vessel. In this vessel the water separates from the air carried in by it. In this vessel the pressure above atmospheric, which adjusts itself to a certain extent, forces the water through the socket $f$, and pipe $c$, and the water flows on through the nozzle S at a pressure of a few tenths of an atmosphere above atmospheric into the water in the tank or receptacle A carrying along with it small bubbles of air and distributing them in the water. The air separated from the water in the vessel W escapes through the pores of the wall above the water level in this vessel in the form of very small bubbles into the water in the tank A; the water in this tank is very effectively aerated thereby and also by the air carried along by the jet from the nozzle S, since gas passes from the air into the liquid and, reversely, from the liquid into the rising bubbles both at the surface of the porous wall of the vessel and also at that of all the small bubbles of air. Corresponding to the partial pressures and solubilities oxygen diffuses materially in the water, whereas carbonic acid goes into the escaping bubbles rich in nitrogen as long as there is an excess of carbonic acid in the water.

The conditions of pressure and the dimensions of the injector I and nozzle S must be so selected that, at the pressure which is necessary to force through the porous wall above the water in the vessel W in the form of small bubbles the quantity of air supplied by the injector, just as much water flows through the pipe $c$ and nozzle S as flows through the injector. If the apparatus is made accordingly, in practical use unavoidable variations in the quantities of water or air which are supplied or in the porosity of the wall of the vessel W will be automatically equalized by the water level in the vessel W rising or falling correspondingly without disturbance in working occurring. The entire quantity of air supplied by the injector will pass through the exposed porous wall of the vessel W so far as it has not already been taken up by the water in the injector and pipe $b$. If the injector temporarily supplies more air, or if the porous wall becomes more impermeable, the pressure of gas will rise in the vessel W, the water level therein will fall and thereby expose a larger porous surface for the air. If the reverse occurs, less air or more water being supplied to the vessel W or if the nozzle S becomes constricted, the water in the vessel W will rise, the area of wall permeable to air will become smaller and the pressure in the vessel W greater corresponding to the possible higher speed of the water through the nozzle S, or to the diminished permeability of the porous wall in consequence of its becoming covered with mud or owing to its swelling.

The vessel W which is simultaneously water separator, air vessel, air distributer and regulating valve for the emitting air may preferably be shaped and arranged in various ways according to the manner in which the apparatus is to be employed in each instance. For small apparatus it is preferable to use pipes of porous cement, porous porcelain, calcareous sandstone or also porous wood, preferably of cylindrical or triangular cross-section, whereas for larger plants vessels comprising parts composed of metal and porous or perforated material are better, as in the form represented in Figs. 3 to 6.

In the constructional form represented in Figs. 3 to 6 the injector $I^1$ is arranged below the surface of the water in the tank A in order to shorten the pipe $b^1$ and in this manner to diminish as much as possible the friction of the mixture of water and air in the same, whereby a more favorable effect is obtained with regard to the quantity of air supplied. The air sucked by the injector passes through the pipe $h$ and the orifices $e^1$. The vessel $W^1$ may consist of a tubular, metallic body, composed of zinc or tinned iron for example, of prismatic or rounded cross-sectional shape, porous hollow bodies $w, w$ being attached to its longitudinal sides, in which bodies the pressure and the quantity of gas forced during a given time through the pores is regulated by the water level in the vessel $W^1$ and in these hollow bodies. The water at a pressure above atmospheric flowing out of the vessel $W^1$ through the pipe $c^1$ goes through a second injector $y$; this injector sucks air in through the pipe $i$ and sends it bubbling in fine bubbles together with the water which propels it into the water in the tank A. Consequently, here also a further portion of the energy of the propelling water is utilized for again aerating the water in the tank.

Particularly for fairly large apparatus the air vessels may be made entirely of metal and provided with fine wire nets $n$ inserted in the form of strips or having finely perforated sheet metal plates $m$ which form the porous members, as clearly shown in Figs. 3 and 5. Such plates or nets may be arranged superposed, and plates and nets may be arranged alternately as shown by way of example in Fig. 6. It is to be understood that the porous bodies $w$ may or may not be used simultaneously with the nets $n$ or plates $m$ as desired, without departing from the spirit and scope of the invention.

We claim:—

1. In apparatus for aerating water, the combination, with a tank containing water which is to be aerated, of a porous air vessel in the water in said tank, an injector in open relation with said air vessel for supplying air and water thereto, and a pipe in open relation with said air vessel for supplying water from the same to the water in the tank.

2. In apparatus for aerating water, the combination, with a tank containing water which is to be aerated, of an air vessel having one or more portions of its walls composed of a material permeable to air in the water in said tank, a water-jet injector in open relation with said air vessel for supplying air and water thereto, and a pipe in open relation with said air vessel for supplying water from the same to the water in the tank.

3. In apparatus for aerating water, the combination, with a tank containing water which is to be aerated, of a porous air vessel in the water in said tank, a water-jet injector in open relation with said air vessel for supplying air and water thereto, a second water-jet injector in said tank, and a pipe connecting said air vessel with the latter injector for operating the same with water from said air vessel.

4. An apparatus for aerating water, comprising in combination with a tank containing water which is to be aerated, of a porous air vessel therein, means for supplying air and water to said air vessel, and means for discharging the water from said air vessel into said tank.

5. A device for aerating water comprising in combination a tubular metallic air vessel provided with an inlet and an outlet, and porous hollow air discharging bodies attached in its sides.

6. A device for aerating water comprising in combination a tubular air vessel, provided with an inlet and an outlet, porous air discharge bodies attached in its sides, and fine wire nets inserted in its wall, for discharging air therefrom.

7. A device for aerating water comprising in combination a tubular air vessel, having a metallic body and provided with an inlet and an outlet, porous air discharge bodies attached in its sides, and a plurality of alternately superposed wire nets and perforated plates inserted in its wall for discharging air therefrom.

8. A device for aerating water comprising in combination a tubular air vessel having a metallic body provided with an inlet and an outlet, and fine wire nets inserted in its wall for discharging air therefrom.

9. A device for aerating water comprising in combination a tubular air vessel having a metallic body and provided with an inlet and an outlet, and a plurality of alternately superposed wire nets and perforated plates inserted in its wall for discharging air therefrom.

In testimony whereof we have signed our names to this specification in the presence of two witnesses.

GEORG ERLWEIN.
ERNST MARQUARDT.

Witnesses:
HENRY HASPER,
WOLDEMAR HAUPT.